United States Patent [19]

Hachisu

[11] Patent Number: 4,682,930
[45] Date of Patent: Jul. 28, 1987

[54] APPARATUS FOR UPWARD AND DOWNWARD MOVEMENT OF AN ARM IN A ROBOT SYSTEM FOR TAKING OUT INJECTION MOLDED AND DIE CASTING PRODUCTS

[75] Inventor: Kiyoji Hachisu, Maebashi, Japan

[73] Assignee: Ichikoh Engineering, Ltd., Maebashi, Japan

[21] Appl. No.: 787,238

[22] Filed: Oct. 15, 1985

[30] Foreign Application Priority Data

Jun. 5, 1985 [JP] Japan ................... 60-120620

[51] Int. Cl.⁴ ............... B66F 9/00; F16H 25/12
[52] U.S. Cl. ................... 414/589; 414/751;
414/718; 414/719; 414/732; 901/48; 901/21;
901/14; 74/89.15; 212/204
[58] Field of Search ............ 901/48, 16, 19, 20,
901/21, 22, 14, 50, 23, 25, 28, 29; 414/719, 718,
589, 731, 732, 733, 751–753, 590; 74/89.15,
424.8 R, 665 GD; 212/199, 204

[56] References Cited

U.S. PATENT DOCUMENTS

| | | | |
|---|---|---|---|
| 3,734,303 | 5/1973 | Blatt | 414/753 |
| 3,840,128 | 10/1974 | Swoboda, Jr. et al. | 901/22 X |
| 3,884,363 | 5/1975 | Ajlouny | 414/751 X |
| 4,024,959 | 5/1977 | Gruner | 901/16 X |
| 4,444,540 | 4/1984 | Blatt et al. | 414/589 |
| 4,502,830 | 3/1985 | Inaba et al. | 901/29 X |
| 4,604,027 | 8/1986 | Becker et al. | 74/89.15 X |

FOREIGN PATENT DOCUMENTS 0208580 4/1984 German Democratic Rep. .

Primary Examiner—Robert J. Spar
Assistant Examiner—Jay I. Alexander
Attorney, Agent, or Firm—Jordan and Hamburg

[57] ABSTRACT

An apparatus connected to an arm in a robot system removes injection molded and die cast products while compensating for the load on the piston rods of the apparatus. A chuck for grasping the products is moved up and down by a pair of pneumatic cylinders on a frame and intermediate frame. The pneumatic cylinders carry the load of the various elements of the apparatus. In order to eliminate variations in the load carried by the cylinders and absorb the shock at the ends of the cylinder strokes, the apparatus includes surge tanks connected to the cylinders. Compressed air is provided through the surge tanks to provide an upward pressure offsetting the load on the cylinders. When the motor is axially movable on the frame of the apparatus, the chuck is moved over a ball nut rotatably supported on the frame, a first ball screw axially movable on the frame and connected to the motor output shaft and the intermediate frame, and a second ball screw fixed to a chuck lift frame and axially movable on the intermediate frame. The first and second ball screws are connected for synchronous rotation. When the motor is fixed on the frame, first and second ball screws are rotated synchronously through a spline shaft.

4 Claims, 4 Drawing Figures

APPARATUS FOR UPWARD AND DOWNWARD MOVEMENT OF AN ARM IN A ROBOT SYSTEM FOR TAKING OUT INJECTION MOLDED AND DIE CASTING PRODUCTS

BACKGROUND OF THE INVENTION

This invention relates to an Apparatus for upward and downward movement of an arm in a Robot system for taking out injection molded and die casting products.

The upward and downward movement of arms, particularly chucks, in a Robot system have hitherto been performed by a pneumatic cylinder. In the pneumatic cylinder, it is a problem that at both ends of a piston stroke a shock must be absorbed and the piston cannot be stopped at an intermediate position accurately. The arm is hitherto not satisfactorily controlled.

A piston rod of the pneumatic cylinder is loaded by gravity of members moved upwards and downwards. Since the load of the piston rod is unbalanced, it is difficult to absorb the shock at the stroke ends sufficiently.

SUMMARY OF THE INVENTION

This invention has as its object the provision of an apparatus for upward and downward movement of an arm in a Robot system for taking out injection molded and die casting products including a device for minimizing an unbalanced amount of the load exerted by the gravity of the members moved upwards and downwards.

The aforementioned object of the invention is accomplished by providing an apparatus provided with a pneumatic cylinder in addition to a driving equipment for moving the arm upwards and downwards and a surge tank connected between a lower portion of the pneumatic cylinder and a pressure air source. The pneumatic cylinder is attached to a frame of the Robot and a piston rod thereof is connected to a member upwards and downwards movably supported by the frame. The pneumatic cylinder is supplied at its lower portion with compressed air and the piston is pressed by the air only upwards with a power corresponding to the gravity of members moved upwards and downwards by the driving equipment. The pressure of the air supplied to the pneumatic cylinder is maintained constant by a reducing valve without relief means and a surge tank having a larger volume than that of the pneumatic cylinder. The piston rod of the pneumatic cylinder in this invention is held at a top end by the air of constant pressure, and members including a chuck are moved downwards by the driving equipment, at which time the air contained in the pneumatic cylinder and the surge tank is compressed. When the volume of the surge tank is ten times the volume of the pneumatic cylinder, and the air contained in the surge tank is compressed by a full downward stroke of the rod, the volume change of the air is smaller than 1/10 the volume of the surge tank. This means that the pressure change is smaller than 1/10 or 10% of the initial pressure in the surge tank. The amount of the pressure change can be selected freely by selecting the volume of the surge tank.

The force corresponding to the gravity of the members moved upwards and downwards acts on the piston in such a manner that the piston is pressed upwards, so that the upward force and the downward force acting on the piston are balanced. Therefore it is required for the driving equipment to only provide a power corresponding to the change of the air pressure. In this invention, the load condition does not exist such that the piston is full-loaded on upwards movement and is not substantially loaded on downwards movement, and variance of the load can be minimized.

In this invention the unbalance of the load from an upward movement to a downward movement is reduced and the power required for the driving equipment for upwards and downward movement can be minimized. By connecting the reducing valve without relief means to the surge tank, the air is moved in a sealed and closed conduit so that air is not substantially spent except for initial filling of the air.

BRIEF DESCRIPTION OF THE DRAWINGS

In the drawings which illustrate embodiments of the invention.

DETAILED DESCRIPTION OF THE PREFERRED EMBODIMENTS

Figure 1:
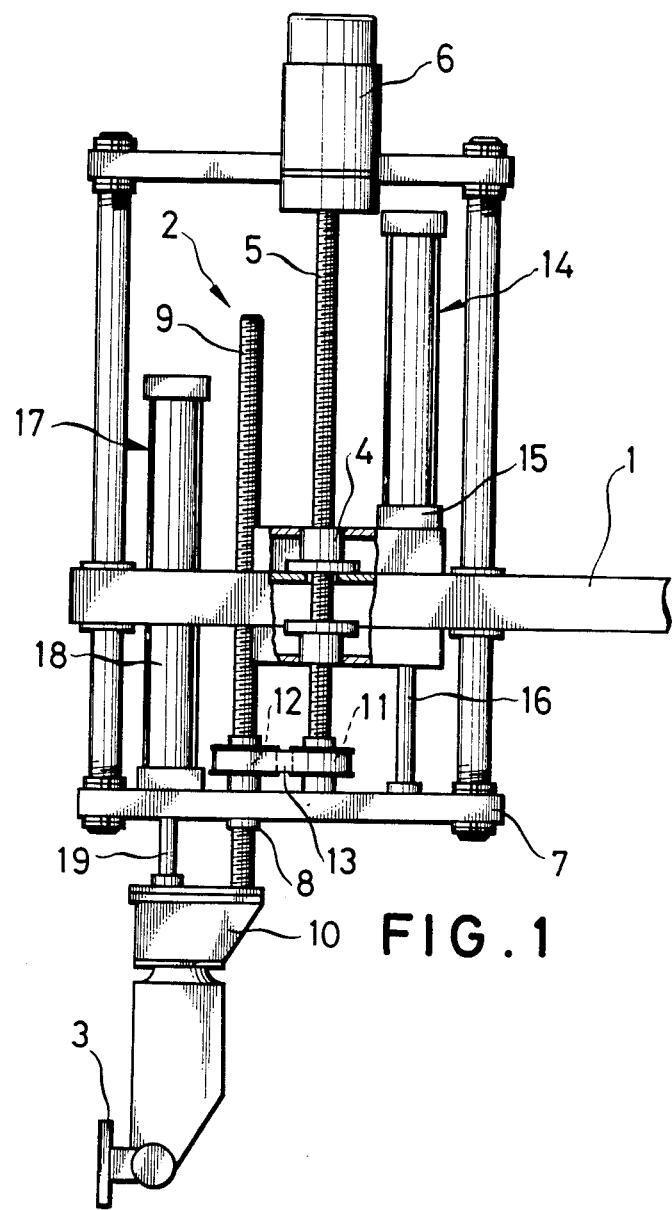
FIG. 1 is a schematic front view of a Robot system for taking out injection molded products according to the invention.

In FIG. 1, a chuck 3 for clamping a product is supported by a frame 1 constructed in a robot arm. Chuck 3 is moved upwards and downwards by a driving equipment 2. Specifically a ball nut 4 is fixed on the frame 1 and a first ball screw 5 is rotatably supported and linearly movably by the ball nut 4. The first ball screw 5 is driven by a motor 6. A casing of the motor 6 is supported by a means not shown in the drawings. The casing is not rotatable but is linearly movable together with the first ball screw 5.

The first ball screw 5 is rotatably supported by a bearing in an intermediate frame 7 but is not linearly movable relative to the intermediate frame 7.

Figure 2:
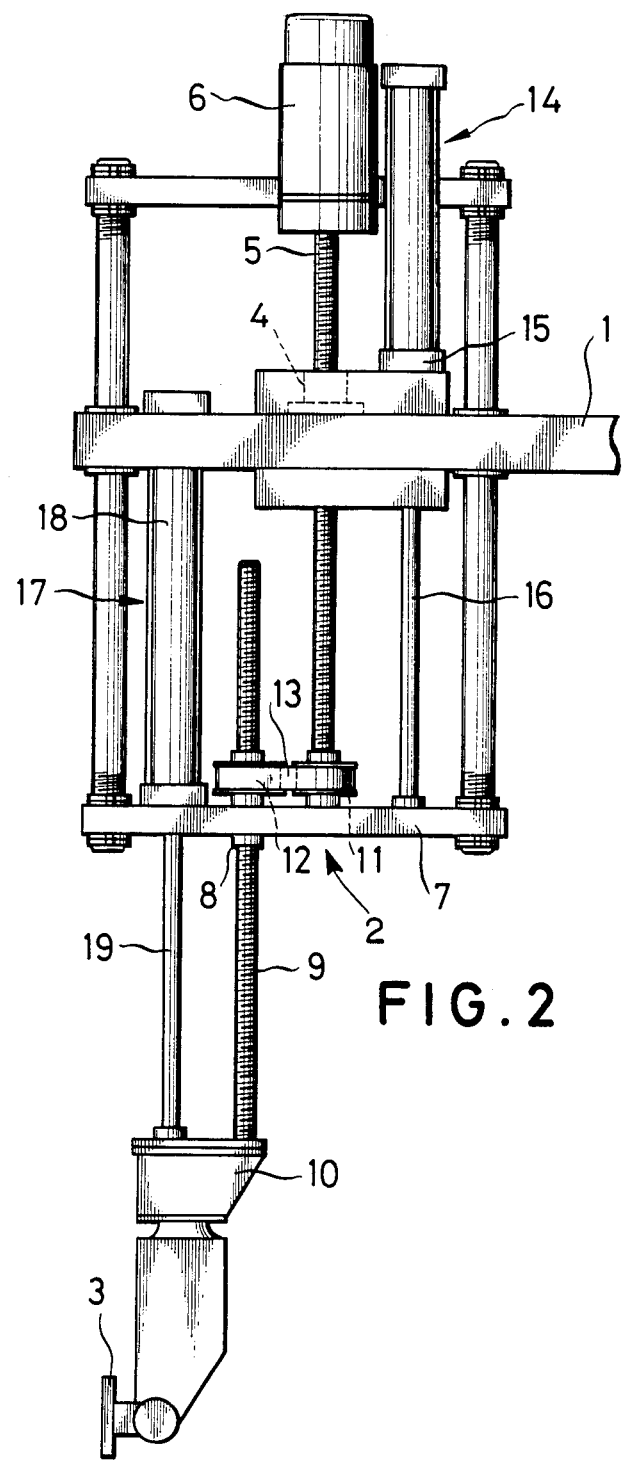
FIG. 2 is a schematic front view of the Robot system of FIG. 1 with the chuck thereof in a fallen position.

A ball nut 8 is supported on the intermediate frame 7. Ball nut 8 is not linearly movable but is rotatable relative to the intermediate frame 7. A second ball screw 9 is inserted into the ball nut 8 and the second ball screw 9 is rotatable and linearly movable relative to the ball nut 8. An end of the second ball screw 9 is fixed to a lift frame 10 supporting the chuck 3. The chuck 3 has fingers for clamping the product (not shown). When the first ball screw 5 is rotated by the motor 6, the first ball screw 5 is moved downwards relative to the frame 1, as shown in FIG. 2, or is moved upwards relative to the frame 1. As the intermediate frame 7 is connected to the first ball screw 5, the intermediate frame 7 is moved upwards and downwards together with the first ball screw 5.

A first toothed wheel 11 is fixed on the first ball screw 5, and a second toothed wheel 12 is fixed on the nut 8. The toothed wheel 11 is connected with the toothed wheel 12 by a toothed belt 13. A toothed ratio of the toothed wheel 11 to toothed wheel 12 is 1:1. When a pitch of the first ball screw 5 is the same as a pitch of the second ball screw 9, a moving length of the chuck 3 is essentially twice that of the first ball screw. The ball nut 8 is rotated synchronous with the rotation of the first ball screw 5, and the second ball screw 9 is nonrotatably fixed to the lift frame 10, so that the second ball screw 9 is moved upwards and downwards in dependence on the rotation of the ball nut 8. Therefore, the moving length of the second ball screw 9 is added to the moving length of the first ball screw 5, so that the moving length of the chuck 3 is twice the moving length of the first ball screw 5. It is not necessary to limit the ratio of the moving length to 2:1. The ratio of the moving length between the chuck and the first ball screw can be any selected value.

The driving equipment 2 includes the motor 6, the first ball screw 5, the intermediate frame 7, the ball nut 4, the ball nut 8 and the second ball screw 9.

A casing 15 of a first pneumatic cylinder 14 is fixed on frame 1 and a rod 16 of the pneumatic cylinder 14 is connected with the intermediate frame 7.

A casing 18 of a second pneumatic cylinder 17 is fixed on intermediate frame 7 and a rod 19 thereof is connected with the lift frame 10.

Figure 3:
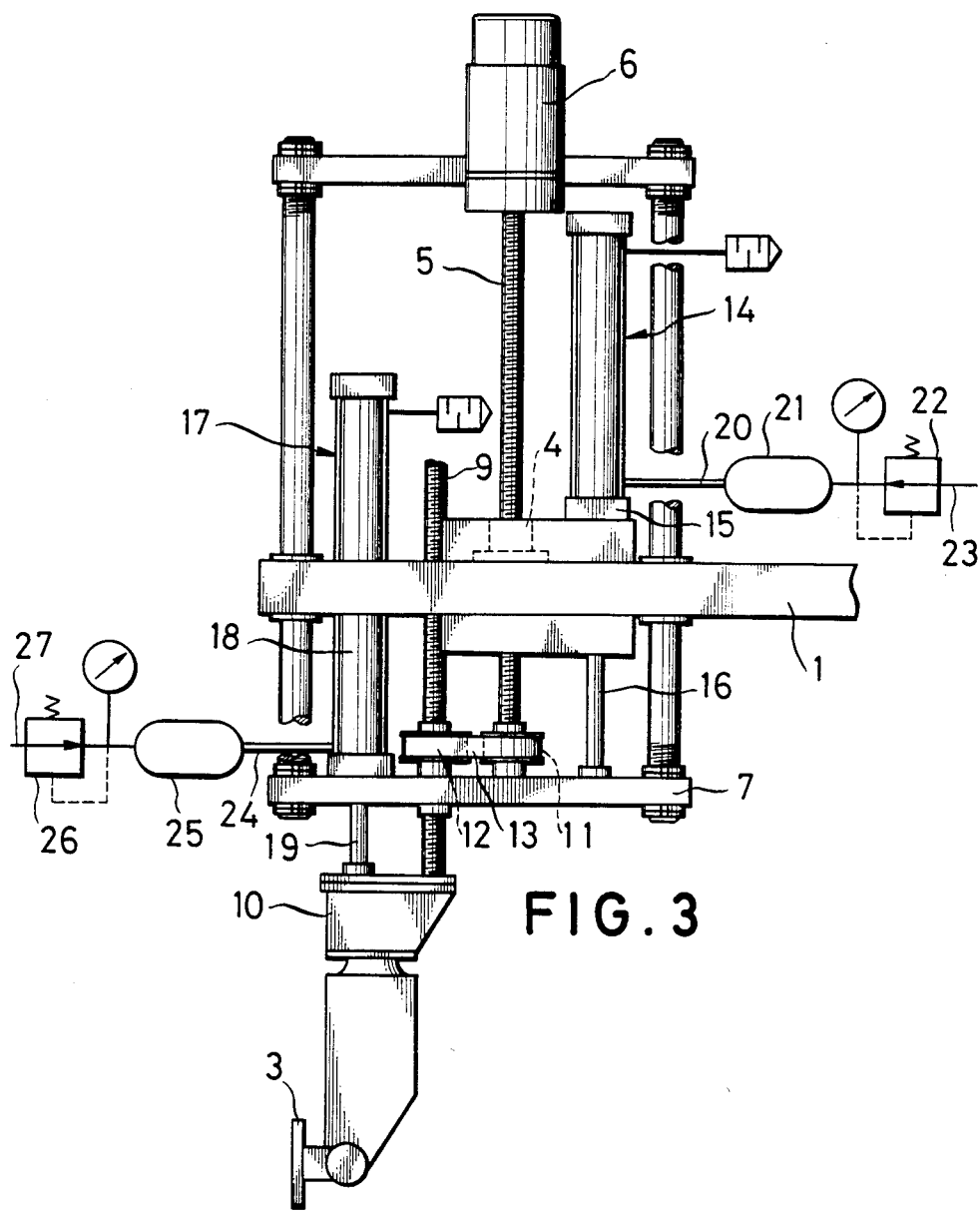
FIG. 3 is a front view illustrating the air cylinders and their pneumatic system.

As shown in FIG. 3, a first surge tank 21 is connected with the first pneumatic cylinder 14 on its rod side through a conduit 20. An air supply conduit 23 with a regulator such as a reducing valve 22 without relief means is connected with the first surge tank 21.

A second surge tank 25 is connected with a casing 18 of the second pneumatic cylinder 17 on its rod end through a conduit 24 and an air supply conduit 27 with a regulator such as a reducing valve 26 without relief means is connected with a second surge tank 25.

The first surge tank 21 has a larger volume than the first pneumatic cylinder 14 and the second surge tank 25 has a larger volume that the second pneumatic cylinder 17. For example, the volume of the first pneumatic cylinder 14 is selected to be 2.2 l and that of the first surge tank 21 is selected to be 22 l. In this case, the volume of the first surge tank 21 is ten times that of the first pneumatic cylinder 14, and when the volume of the second pneumatic cylinder 17 is selected to be 1.4 l and the volume of the second surge tank 25 is selected to be 14 l, the same volume ratio as that between the first surge tank and the first pneumatic cylinder, or 10:1, is obtained.

The rod 16 of the first pneumatic cylinder 14 is loaded by the gravity of all elements which are supported by the intermediate frame 7 and is moved upwards and downwards together with the intermediate frame 7. The the force corresponding to the above mentioned gravity of all elements is supplied to a piston in the first pneumatic cylinder 14 on a rod end side. The force acting downwards on the piston by the gravity of the elements and the force acting upwards on the piston by the air pressure can be balanced. At this balanced air pressure, the regualtor 22 is controlled for retaining the pressure in the filled surge tank 21. In the same way, the regulator 26 is controlled.

The pneumatic cylinders 14 and 17 are supplied with air for only providing the upward force. As the upward force and the downward force are balanced, the driving equipment 2 is not loaded by the gravity of the moving elements, and a small power motor can be utilized.

When the intermediate frame 7 and the lift frame 10 are moved upwards and downwards the air volume in the pneumetic cylinders 14, 17 is changed by moving the air in dependence on the movement of the piston. As a standard position, a top position of the piston is selected, When the intermediate frame 7 and the lift frame are moved downwards by the screws 5, 9, the air in the chamber below the piston (rod end side) in the pneumatic cylinders 14, 17 is compressed by the piston, because the supply conduits 23 and 27 are supplied with compressed air. The pressure of the air in conduits 20 and 24 is increased depending on the reduction of the volume of the chamber below the piston.

When the piston is moved from the uppermost position to the lowermost position, the change of the volume and pressure of the air is greatest, i.e., the volume of the air is smallest and the pressure of the air is greatest at the lowermost position of the piston. The air pushed out from the chamber in the cylinder is received in the surge tanks 21, 25. Therefore, the pressure in the surge tank is increased.

If the maximum volume of the chamber in the cylinder is selected to be 1/10 that of the surge tank, the change in the air pressure is 1/10 or 10% of the predetermined pressure.

If a surge tank having a volume more than ten times that of the cylinder chamber is selected, the change of the pressure in the surge tank is smaller than 1/10 of the predetermined pressure. The change of the pressure in the cylinder can be minimized by using the larger surge tank. The load of the driving equipment is influenced only slightly by the change of the pressure, for example, the change of the load is within 10% (by using a surge tank with a volume ten times that of the cylinder chamber). As the change of the load is small, the shock exerted by stopping the chuck is absorbed easily in the surge tank. The chuck is moved through the ball screw, so that it can be stopped in any position positively.

The drivig equipment can be altered in the scope of this invention and is not limited to the construction shown in FIG. 1.

Figure 4:
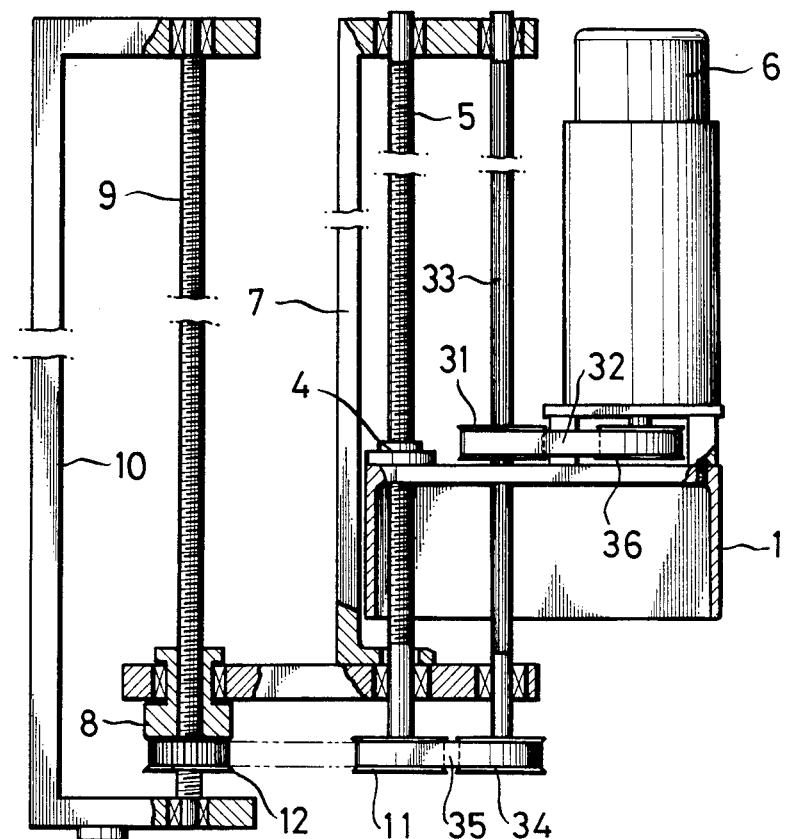
FIG. 4 is a schematic front view of another embodiment for the driving equipment.
Figure 4:
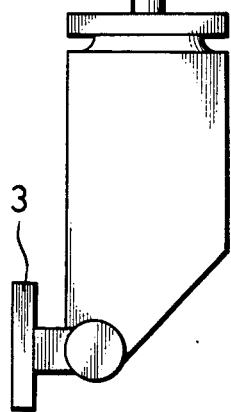

FIG. 4 shows an alternative embodiment of the driving equipment. The motor 6 is fixed in the frame 1. A toothed wheel 36 is fixed on an output shaft of the motor 6. The toothed wheel 36 is connected with a toothed wheel 31 rotatably supported on the frame 1 through a toothed belt 32. In the toothed wheel 31, a spline shaft 33 is inserted axially movably but nonrotatably relative to the toothed wheel 31. The spline shaft 33 is supported rotatably on the intermediate frame 7 through bearings.

The ball nut 4, the first ball screw 5, the ball nut 8 and the second ball screw 9 are constructed as shown in FIG. 1. In FIG. 4, a toothed wheel 34, a toothed wheel 11 and a toothed wheel 12 are fixed on the spline shaft 33, th first ball screw 5 and the second ball screw 9, respectively. The toothed wheels 34, 11 and 12 are connected with each other by a toothed belt 35. Therefore, the first ball screw 5 and the second ball screw 9 are rotated synchronous with the rotation of the spline shaft 33.

What is claimed is:

1. An apparatus for upward and downward movement of an arm in a robot system for taking out injection molded and die casting products, comprising:
   a chuck;
   a frame for connection to the arm;
   means upwardly and downwardly movably supported by the frame for supporting the chuck;
   drive equipment supported on the frame comprising a motor and means for upwardly and downwardly moving the chuck;
   a first pneumatic cylinder having a volume and including a casing attached to the frame, a piston rod connected to the means upwardly and downwardly movably supported by the frame for supporting the chuch, and a rod end side;

a first surge tank having a volume larger than the first pneumatic cylinder volume and being connected to the rod end side of the first pneumatic cylinder;

a compressed air source for supplying upward pressure to the pneumatic cylinder;

a first reducing valve without relief means connected between the first surge tank and compressed air source;

wherein the means upwardly and downwardly movably supported by the frame for supporting the chuck comprises a lift frame supporting the chuck, an intermediate frame having the piston rod of the first pneumatic cylinder connected thereto, means for transmitting relative movement between the lift frame and intermediate frame, a second pneumatic cylinder having a volume and including a housing attached to the intermediate frame, a piston rod connected to the lift frame, and a rod end side, a second surge tank having a volume larger than the second pneumatic cylinder volume and being connected to the rod end side of the second pneumatic cylinder, and a second reducing valve without relief means connecting the second surge tank and the compressed air source; and wherein the motor is nonrotatably but axially movably supported on the frame, and the means for upwardly and downwardly moving the chuck comprises a ball nut rotatably but axially unmovably supported on the frame, a first ball screw inserted axially movably but nonrotatably in the ball nut, the first ball screw having a first end connected to the output shaft of the motor and a second end rotatably but axially unmovably supported on the intermediate frame, a second ball screw rotatably and axially movably inserted in the intermediate frame, the second ball screw having a first end fixed to an end of the lift frame, and means for connecting the first and second ball screws with respect to each other in a synchronously rotatable manner.

2. An apparatus as in claim 1, wherein a ratio of the volume of the first surge tank to the first pneumatic cylinder is substantially the same as a ratio of the volume of the second surge tank to the second pneumatic cylinder.

3. An apparatus for upward and downward movement of an arm in a robot system for taking out injection molded and die casting products, comprising:

a chuck;

a frame for connection to the arm;

means upwardly and downwardly movably supported by the frame for supporting the chuck;

drive equipment supported on the frame comprising a motor and means for upwardly and downwardly moving the chuck;

a first pneumatic cylinder having a volume and including a casing attached to the frame, a piston rod connected to the means upwardly and downwardly movably supported by the frame for supporting the chuck, and a rod end side;

a first surge tank having a volume larger than the first pneumatic cylinder volume and being connected to the rod end side of the first pneumatic cylinder;

a compressed air source for supplying upward pressure to the pneumatic cylinder;

a first reducing valve without relief means connected between the first surge tank and compressed air source;

wherein the means upwardly and downwardly movably supported by the frame for supporting the chuck comprises a lift frame supporting the chuck, an intermediate frame having the piston rod of the first pneumatic cylinder connected thereto, means for transmitting relative movement between the lift frame and intermediate frame, a second pneumatic cylinder having a volume and including a housing attached to the intermediate frame, a piston rod connected to the lift frame, and a rod end side, a second surge tank having a volume larger than the second pneumatic cylinder volume and being connected to the rod end side of the second pneumatic cylinder, and a second reducing value without relief means connecting the second surge tank and the compressed air source; and wherein the motor is fixed on the frame, and the means for upwardly and downwardly moving the chuck comprises a spline shaft and a first ball screw each rotatably supported on the intermediate frame and rotatably and axially movably supported on the frame, a ball nut rotatably supported on the intermediate frame, and a second ball screw fixed to the lift frame and axially movably supported on the intermediate frame, the first and second ball screws being rotated synchronously through the spline shaft.

4. An apparatus as in claim 3, wherein a ratio of the volume of the first surge tank to the first pneumatic cylinder is substantially the same as a ratio of the volume of the second surge tank to the second pneumatic cylinder.

* * * * *